United States Patent [19]
Hoppe

[11] Patent Number: 5,123,542
[45] Date of Patent: Jun. 23, 1992

[54] METHOD AND APPARATUS FOR CLEANING, DISTRIBUTING AND AERATING GRAIN

[76] Inventor: Gerald W. Hoppe, P.O. Box 157, St. Clair, Minn. 56080

[21] Appl. No.: 709,273

[22] Filed: Jun. 3, 1991

[51] Int. Cl.$^5$ .......................... B07B 1/00; B65G 69/12
[52] U.S. Cl. .......................................... 209/236; 193/3; 193/25 R; 209/240; 209/254; 209/281; 239/546; 239/651; 414/299
[58] Field of Search ............... 209/240, 235, 236, 243, 209/244, 250, 251, 257, 281, 241; 193/3, 9, 25 R; 414/293, 299, 397; 239/651, 546

[56] References Cited

U.S. PATENT DOCUMENTS

| | | | |
|---|---|---|---|
| 841,959 | 1/1907 | Gentrup | 209/281 X |
| 1,229,542 | 6/1917 | Stewart et al. | 209/281 X |
| 1,327,452 | 1/1920 | Williams | 239/546 X |
| 2,814,529 | 11/1957 | Arnt | 239/546 X |
| 4,069,146 | 1/1978 | Lower | 209/254 |
| 4,231,861 | 11/1980 | Hannie et al. | 209/246 X |
| 4,549,960 | 10/1985 | Hoppe | 209/240 |
| 4,611,965 | 9/1986 | Dixon et al. | 414/299 |
| 4,750,997 | 6/1988 | Hoppe | 209/236 |

Primary Examiner—Donald T. Hajec

[57] ABSTRACT

An improved apparatus for cleaning, distributing and aereating grain is mounted in a storage structure and includes a frustro-conical screen device secured symetrically to an imperforate funnel-shaped member. A fan assembly is secured to the funnel-shaped body and is provided with a conduit which extends to the exterior. An adjustable control spout permits uniform distribution of grain upon the screen device where the fine material passes through the apertures in the screen while the grain is discharged into the storage structure. After the cleaning and distribution of steps are completed, the apparatus will then be inverted to position the screen device in the concave crater of the grain pile while positioning the funnel shaped body and fan assembly uppermost. The fan assembly will be energized to aereate the grain and present damage due to mold or fungus.

7 Claims, 3 Drawing Sheets

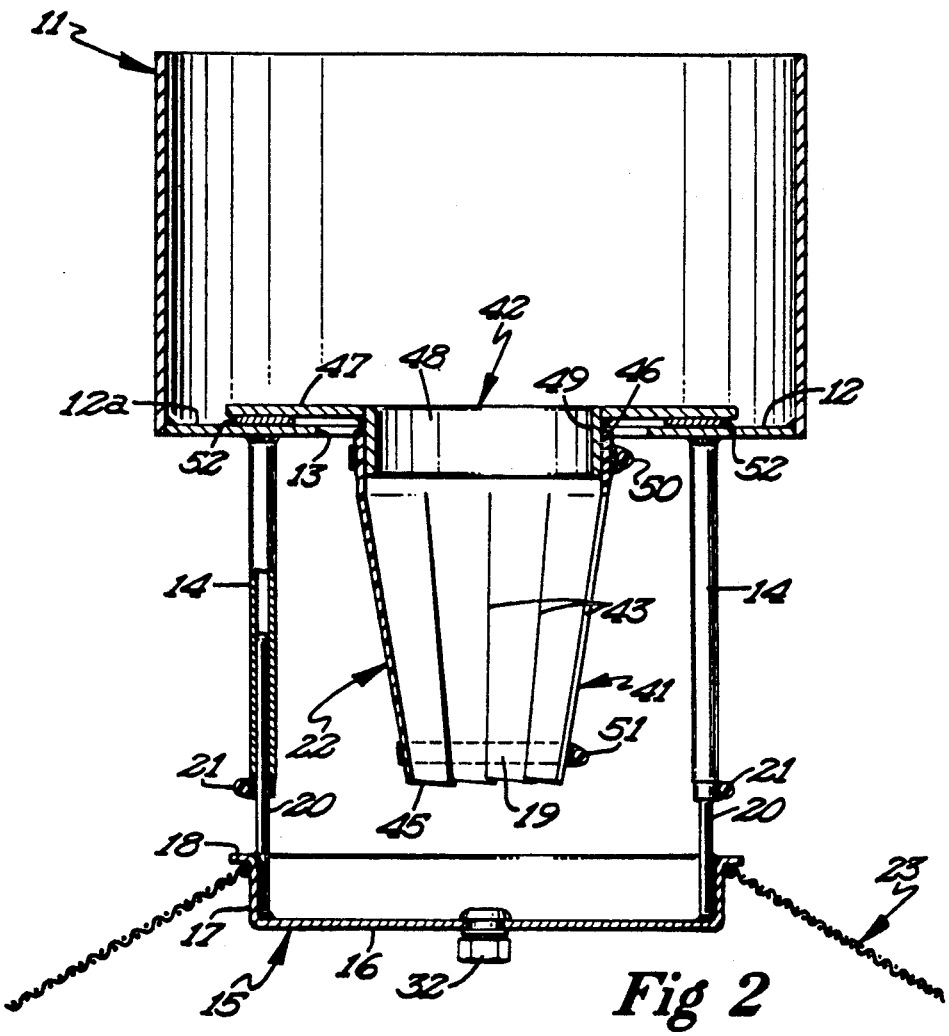
Fig 2
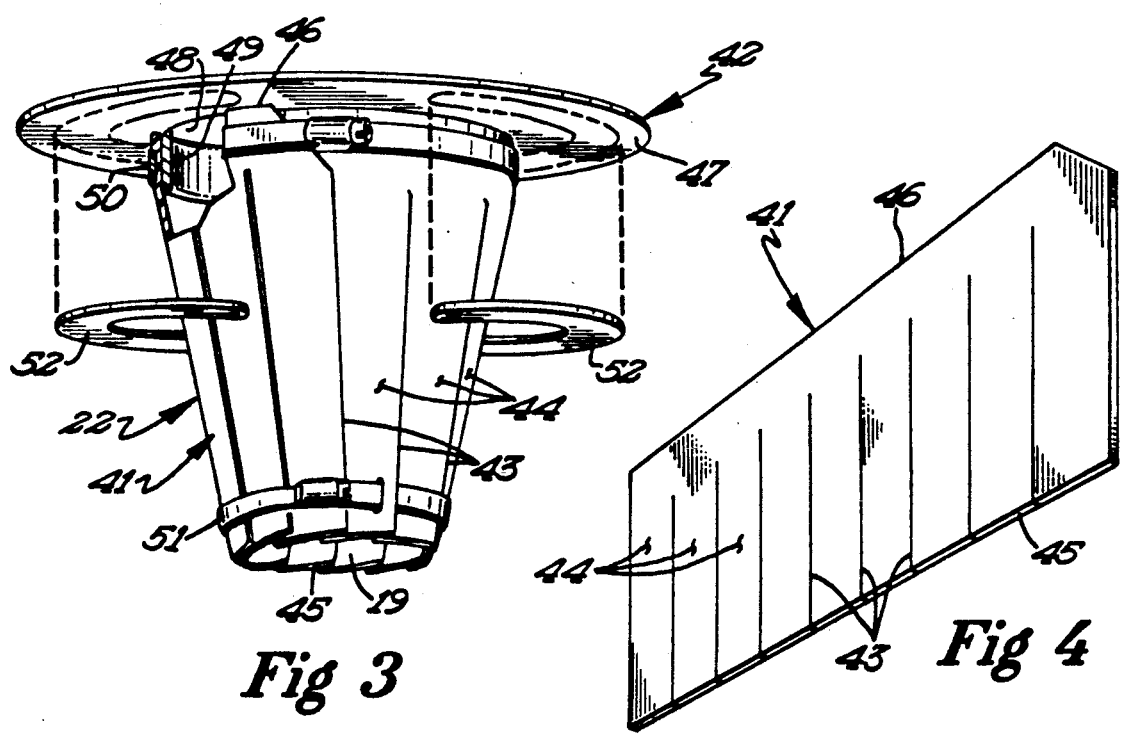
Fig 3
Fig 4

METHOD AND APPARATUS FOR CLEANING, DISTRIBUTING AND AERATING GRAIN

FIELD OF THE INVENTION

This invention relates to grain cleaning and aeration and more particularly to an apparatus method for cleaning, distributing and aerating grain.

BACKGROUND OF THE INVENTION

Harvested grain crops, such as corn or the like, are usually stored and the moisture content is typically controlled by drying When the grain is sold, the price of the grain is effected by the amounts of fines in the grain. For example, the Federal Standards allows a maximum of 3% fines (broken corn and foreign material) in corn for No. 2 grade corn, and a maximum of 2% for No. 1 corn. Aeration of the grain during storage reduces the occurrence of mold damage.

A grain cleaner and distributor apparatus is disclosed in my U.S. Pat. No. 2,750,997 and this apparatus is effective in cleaning grain or similar material delivered to a storage structure. However, the distribution of the grain with this apparatus cannot be closely controlled because the grain receiver is non-adjustable. I have provided a novel receiver for this grain and distributing apparatus which permits controlled distribution of the grain into the storage structure. I have also developed a method of cleaning, distributing and aerating the grain with this improved apparatus.

SUMMARY OF THE INVENTION

It is an object of this invention to provide an improved grain cleaner and aerating apparatus which has a grain receiving control device for effectively controlling the distribution of the grain into the storage structure.

Another object of this invention is to provide a novel method of cleaning and distributing the grain by using the improved apparatus in one mode of operation and thereafter engaging a concavity at the top of the mound of grain in the storage structure with the apparatus in an inverted condition to aerate grain.

FIGURES OF THE DRAWING

FIG. 1 is a side view partly in elevation and partly in section illustrating the improved grain spreading and cleaning apparatus mounted in a storage structure, FIG. 2 is a cross-sectional view of grain receiving components illustrating details of construction thereof, FIG. 3 is a perspective view of the grain receiving components illustrated in FIG. 3, FIG. 4 is a perspective view of the blade used to construct the control spout, FIG. 5 is a diagrammatic view illustrating the improved grain cleaning and distributing apparatus as it is used to clean and distribute the grain;

DESCRIPTION OF THE PREFERRED EMBODIMENT

Figure 1:
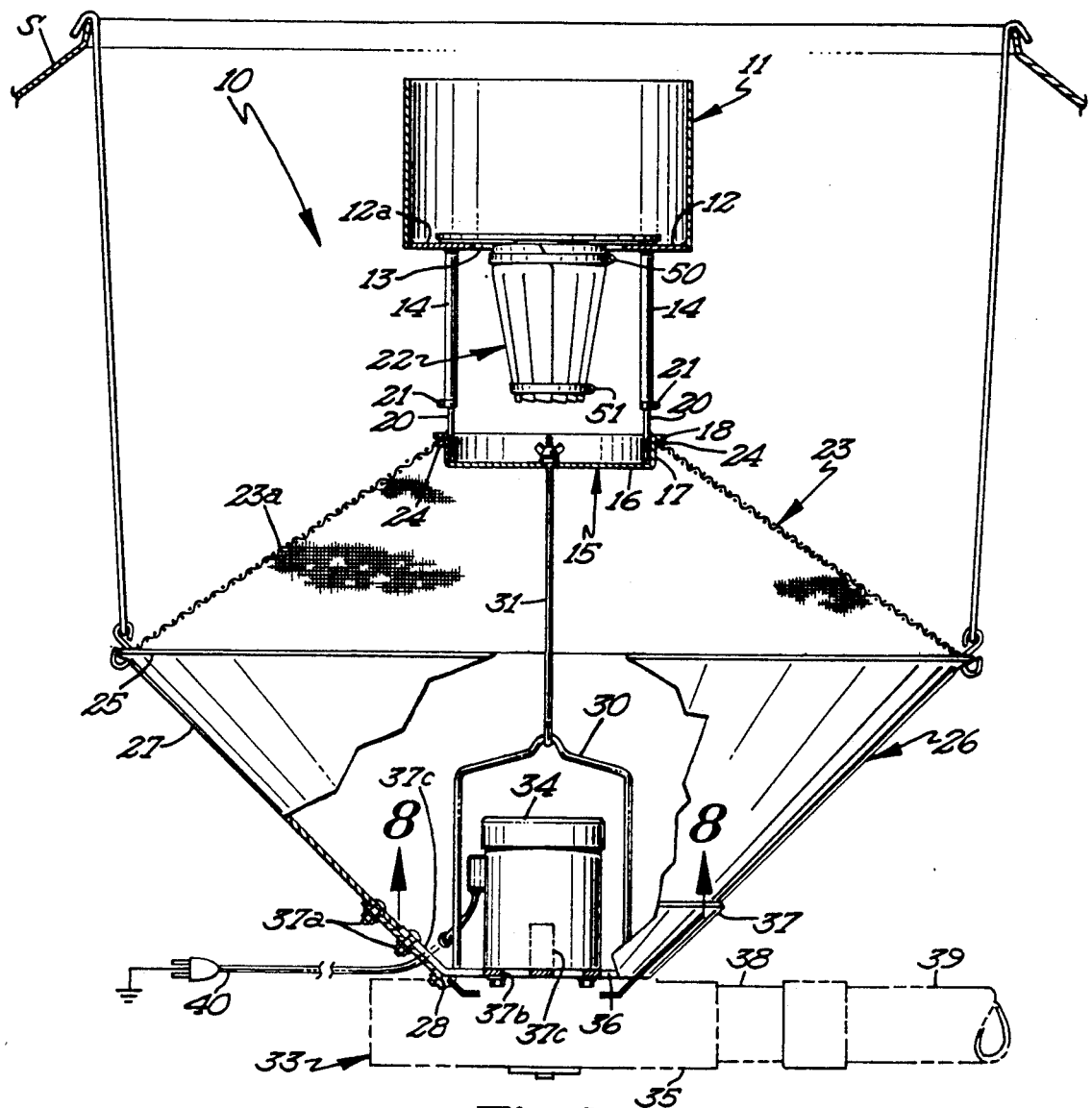

Referring now to the drawings and more specifically to FIG. 1, it will be seen that one embodiment of the improved grain cleaning and distributing apparatus, designated generally by the reference numeral 10, is thereshown. The apparatus 10 is mounted in a conventional storage structure S for grain or the like adjacent the opening located at the top of the storage structure. It is again pointed out that the storage structure may be any of the conventional kinds including bins, truck bodies or similar structures for use in the storage and/or delivery of grain The apparatus 10 is mounted or suspended adjacent the opening 0 to permit grain delivered to the storage structure to be received, cleaned and distributed by the apparatus.

The apparatus 10 includes a cylindrical grain receiving member 11 having a lower wall 12 with a centrally located opening 13 therein. A pair of elongate vertically disposed tubular elements 14 have their upper end rigidly secured to the lower surface of the lower wall 12 and depend therefrom. A tray-shaped distributor member 15 is positioned below the cylindrical grain receiving member 11 and has a lower wall 16 integral with an upstanding annular wall 17. The distributor member 15 is provided with an out-turned flange 18 which is integral with the annular wall 17. The distributor member 15 is also provided with a pair of vertically disposed elongate rods 20, each telescopically engaging in one of the tubular elements 14. Each vertically tubular element 14 is provided with a vertically adjustable lock element 21 thereon to permit the distributor member to be vertically shifted relative to the grain receiving member 11. A control spout device 22 is adjustably mounted on the cylindrical grain receiving member and depends therefrom.

It is pointed out that the tubular members 14 could be shortened in length and secured to the distributor member 15 rather than grain receiving member 11. The rods 20, on the other hand, would be lengthened and secured to the distributor member 15 rather than the grain receiving member 11. Each of the tubular members 14 would be secured to the distributor member 15 in registering relation with openings in the lower wall 16. With this arrangement, the grain receiver member 11 may be collapsed downwardly on the distributor member 15 by loosening the lock elements 21 and urging the rod (extended in length) downwardly through the tubular members and opening in the distributor member.

The apparatus 10 also includes a frustro-conically shaped screen device 23 having an opening at its upper end. An upper bead or rim 24 is secured to the screen 23a of the screen device at the upper end opening. It will be noted that the upper opening is of a size to receive the tray-shaped distributor member 15 therein with the out-turned flange 18 thereof engaging the upper bead 24. The screen device is also provided with a lower annular bead or rim 25 which is secured to the screen 23a at its lower edge.

In some instances, it may be desirable to reinforce the screen 23a because of the load exerted on the surface thereof. Therefore, a plurality of straight reinforcing rods will extend between and be welded to upper rim 24 and leave rim 25 to reinforce the screen 23a.

A rigid imperforate funnel-shaped body 26 engages the lower edge portion of the screen device 22 and projects downwardly. The funnel-shaped body 26 has a tapered wall 27 that tapers downwardly and terminates in a lower end portion 28. The lower end portion 28 is provided with openings therein for connection to a motor mounting means. The U-shaped hanger 30 is secured to the lower end of an elongate rod 31 which has its upper threaded end projecting through an opening in the lower wall 16 of the distributor member by a wing nut 32.

A fan assembly 33 is secured to the lower cylindrical end portion 28 of the funnel-shaped body 26 and depends therefrom. The front assembly 33 includes an electric motor 34 which is secured to a fan housing 35, the housing having an upwardly facing inlet 36.

The motor mounting means includes a small funnel 37 which is secured to the lower end portion of the funnel-shaped body 26 by nut and bolt assemblies 37a. A circular mounting member 37b is secured to the lower end of the electric motor 34 and is provided with attachment straps 37c. The straps 37c extend upwardly at an angle with respect to the mounting member 37b and each strap has an opening therein. The straps are positioned against the inner surface of the funnel-shaped body 26 and are secured thereto by nut and bolt assemblies 37a. The electric motor is therefore mounted in vertical relation within the funnel-shaped body 26.

The fan housing 35 accommodates a fan therein which is driven by the output shaft (not shown) of the electric motor 34. The fan housing 35 is provided with an outlet 38 which is connected in communicating relation with one end of an elongate conduit 39. The conduit extends outwardly to the exterior and a suitable conductor 40 having a conventional bayonette type socket member is connected to a source of electrical power and to the electric motor 34 for operating the electric motor. The conductor 40 extends through registering openings in funnel 37 and the funnel-shaped body 26 as best seen in FIG. 1. When the electric motor 34 is energized, air will pass through the inlet 36 and will be discharged through the outlet 38 and into the conduit 39.

The operation of the apparatus 10 during the grain cleaning and distribution phase is substantially identical to that disclosed in my U.S. Pat. No. 4,750,997. Grain passes through the grain receiving member 11 and into the tray-shaped distributor member 15 where the grain is discharged outwardly upon the screen device 22. The openings in the screen device 23 are of a magnitude to prevent grain from passing therethrough but do allow the fines to pass therethrough.

When the fan assembly is energized, the fine material moving downwardly along the screen device will be subjected to a pressure differential and the fines material will be sucked through the screen into the funnel-shaped body 26 then into the fan housing while entrained in a stream of air. These fines will thereafter be discharged exteriorly of the storage structure through the conduit 39.

Since the electric motor 34 is positioned interiorly of the cleaning apparatus 10, the electric motor will be cooled by the air flowing downwardly through the funnel over the motor. Since the output shaft is facing downwardly, there is little if any chance of rainwater flowing into the motor (and the resultant shorting) in the event that the apparatus is accidentally exposed to rain. It is pointed out that the electric motor 34 may be positioned exteriorly of the apparatus 10 in the manner disclosed in my U.S. Pat. No. 4,750,997.

During the distribution and cleaning phase of the grain, it is desirable to have uniform distribution of the grain in the storage structure. Means are provided for permitting a more uniform distribution of the grain in the storage structure and this means includes the adjustable control spout 22. The adjustable control spout 22 includes a spout member 41 which is mounted on an adjustable mounting member 42. The spout member 41 is formed of flexible plastic material and is preferably formed from a rectangular blank of such material as illustrated in FIG. 4. The blank has a plurality of vertical slits 43 therein that extend from the bottom edge 45 towards but terminates short of the top edge 46 as best seen in FIG. 4. These slits provide the panel with a plurality of panel elements 44.

The adjustable mounting member is formed of a rigid ferrous material and includes a circular flat body 47 having a central opening 48 therein. The central opening 48 communicates with and is defined by a depending cylindrical flange 49. The mounting member is positioned within the grain receiving member 11 so that the circular flat body 47 engages the upper surface 12a of the lower wall 12 of the grain receiving member. The depending cylindrical flange 49 projects through the central opening 13 in the lower wall of the grain receiving member and the depending flange is engaged by the upper end portion of the spout member 41. An upper clamping collar 50 clamps the upper end portion of the spout member to the depending cylindrical flange 49. A lower adjustable clamping collar 51 extends around and clamps the lower end portion of the spout member 41.

The lower adjustable clamping collar 51 may be adjusted to restrict or enlarge the cross-sectional size of the lower end portion of the spout member and to thereby control the amount of grain discharged from the spout member into the distributor member 15. This can be easily accomplished by tightening or loosening the lower adjustable clamping collar 51. When the lower adjustable collar is tightened, the panel elements 44 are urged into over-lapping relation with each other in a progressive manner to thereby reduce the cross-sectional size of the lower end of the opening. When the lower adjustable clamping collar is loosened, the cross-sectional size of the spout will be enlarged.

It is also desirable to adjust the spout laterally relative to the grain receiving member 11 and relative to the distributor member 15. It will therefore be seen that the diameter of the circular flat body 47 of the mounting member 42 has a diameter less than the diameter of the grain receiving member 11. It will further be noted that the opening 13 in the lower wall 12 of the grain receiving member is also larger than the diameter defined by the exterior surface of the depending cylindrical flange 49. Therefore the mounting member 42 can be translated laterally in any direction relative to the lower wall 12 of the grain receiving member.

Means are provided for retaining the mounting member in an adjusted position. This means includes a plurality of arcuate shaped magnets 52. The magnets are disposed between the upper surface 12a of the lower wall 12 and the lower surface of the circular flat body 47. Since the mounting member 42 in the cylindrical grain receiving member are formed of ferrous material, the magnets 52 are attracted to both of these members and serve to hold the control spout device 21 in an adjusted position.

The unique design of the control spout device 21 permits the lumen type passage defined by the spout to be selectively varied at its lower end to control the amount of grain or other material being discharged therefrom into the distributor member 15. The control spout device may also be translated laterally in any direction to vary the position the material will be discharged into the distributor member 15. This allows an operator to adjust the distribution of the material as the storage structure is being filled.

Figure 7:
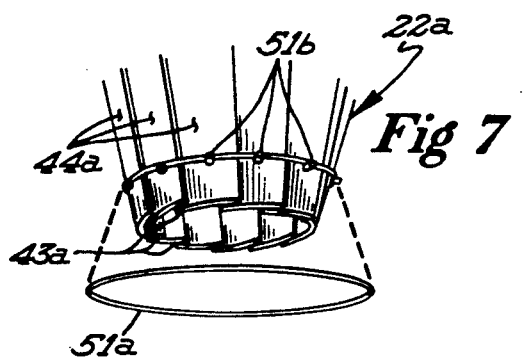
FIG. 7 is a modified form of the control spout device.
Figure 8:
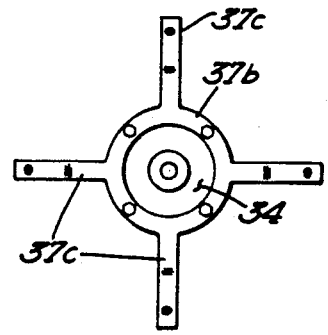
FIG. 8 is a cross-sectional view taken approximately along line 8—8 of FIG. 1 and looking in the direction of the arrows.

Referring now to FIG. 7 a modified form adjustable control spout designated generally by the reference numeral 22a. The control spout 22a is substantially identical to that shown in FIG. 3 and includes slits 43a which define panels 44a. The essential difference in the embodiment of FIG. 7 with respect to the embodiment of FIG. 3 involves the clamping collar or element. In FIG. 7, the clamping element 51a comprises an elastic ring preferably formed of a resilient elastic material including rubber. Each of the panels 44a is provided with a small retainer element 51b which is integral therewith and projects outwardly therefrom. The retainer elements 51b prevent elastic clamping ring 51a from slipping from the lower end of the control spout 22a.

Figure 5:
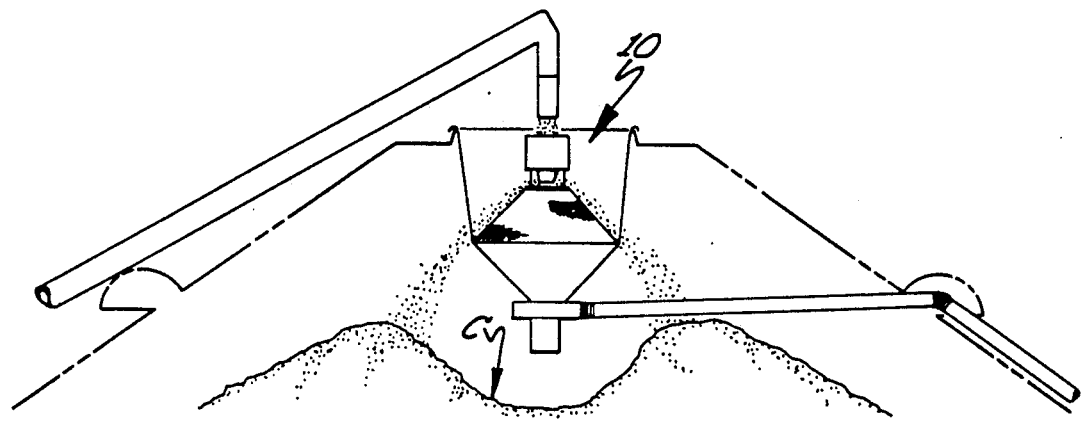

When the storage structure is filled with the grain or similar material, the upper surface of the grain forms a shallow peak having a upwardly facing concaved depression located just below the apparatus 10 as shown in FIG. 5. This concave depression C in the grain conforms generally to the exterior configuration of the screen device 23 and the funnel shaped body 26. This upper profile of the fill storage structure is simply a characteristic of the distribution function of the apparatus 10.

Figure 6:
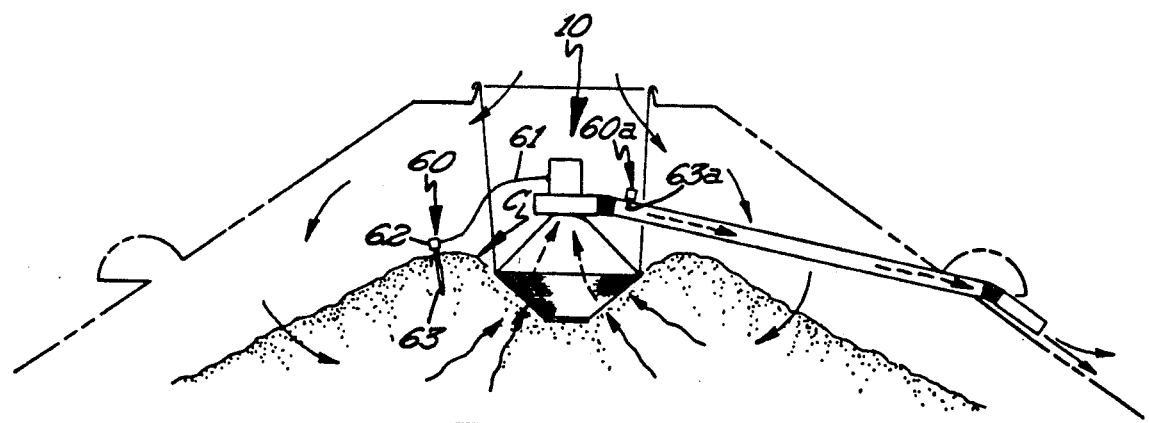
FIG. 6 is a diagrammatic view similar to FIG. 2 but illustrating the apparatus in an adjusted mode of operation for aerating the grain.

After the storage structure has been filled, the operator may remove the apparatus from its suspended relation with the storage structure and may disconnect the hanger 30 from its engaged relation with the cylindrical lower end portion 28 of the funnel shaped body. This permits the cylindrical member 11, the tray-shaped distributor member 15 and the control spout 22 to be removed from the apparatus which may then be inverted to position the screen device in the concave depression C. The screen device will engage the surface of the grain defining the depression and the fan assembly will be positioned uppermost as illustrated in FIG. 6. The conduit 39, which is flexibly, may then be directed through an opening in the storage structure so that the outer end of the conduit is located exteriorly of the storage structure. When the fan motor 34 is energized to operate the fan, air will be pulled through the grain and through the screen device and will be directed to the exterior through the discharge conduit 39.

In the proposed embodiment, operation of the fan assembly motor 34 is made responsive to the temperature of the air passing upwardly through the grain. A temperature sensitive probe device 60 is electrically connected to the fan motor 34 by an electrical conductor 61. The probe device includes a control box 62 having an adjustment dial for preselecting an operating temperature level. The probe device also includes an elongate temperature sensitive probe 63. The probe 63 senses the temperature of the air and surrounding grain adjacent its lower tip. With this arrangement, the fan motor 34 will operate until the temperature of all the grain surrounding the lower end of the probe 63 falls below the selected temperature level which then opens the electrical circuit to the fan motor 34. Since the grain has been cleaned (all fines removed), aeration can be easily accomplished.

The probe device 60a can be moved to any selected position including suspected hot spots. As an alternative sensing method, the probe device 60a may be mounted in the conduit 39 immediately adjacent the discharge outlet 38 in the fan housing 35. This probe device is identical in all respects to that previously described except that the probe 63a is shorter in length than the probe 63. The temperature of the air drawn through the grain into the fan housing 35 will be sensed as it is discharged from the housing. When the temperature of this air stream falls below the prescribed level, the circuit to the fan motor will be opened.

It is also pointed out that a conventional timing control (not shown) may be provided which could be placed at a location remote from the apparatus and storage structure but in controlling relation with the fan motor circuit. The timing control could be selectively set to operate the fan motor for a predetermined period of time (for example, 15 to 60 minutes or longer) before opening the circuit to the fan motor.

Thus my novel improved apparatus permits the grain or similar material to be cleaned and distributed in a storage structure and thereafter aerated by placing the apparatus in a different mode of operation. Thus is will be seen that the apparatus 10 permits grain to be effectively cleaned, uniformly distributed and aerated during and immediately after loading.

Thus, it will be seen that I have provided a novel apparatus and method for cleaning grain as it is uniformly distributed into a storage structure and which is also operable to aerate the grain after loading.

What is claimed is:

1. Apparatus for cleaning and spreading particulate crops, delivered to a storage structure having an opening in an upper portion thereof, comprising;
   a frusto-conically shaped perforate screen device having perforations therein of a size to permit crops to pass thereover, but permitting other small material to pass therethrough, said screen device having an upper annular rim and a lower annular rim,
   an imperforate funnel-shaped member having an upper annular edge engaging the lower annular rim of said screen device and having a lower end portion,
   a fan assembly including, a fan housing having an inlet and an outlet, means releasably securing the inlet of the fan assembly to the lower end portion of said funnel-shaped member in communicating relation therewith, an elongate discharge conduit having one end thereof connected in communicating relation to the outlet of the fan assembly housing and having the other end thereof connected to the exterior of the storage structure,
   a vertically disposed cylindrical crop receiving member for receiving crops delivered through the opening in the storage structure, said cylindrical member including a lower wall having an opening therein,
   a shallow cup-shaped member positioned below said cylindrical member, means adjustably securing said cup-shaped member to said cylindrical member to adjustably position the cup-shaped member at a selected vertical position below the cylindrical member, an adjustable vertically disposed elongate control spout having an upper end and a lower end, means adjustably securing said spout to said cylindrical member and being laterally adjustable to laterally shift the spout relative to the opening in the cylindrical member and relative to the cup-shaped member, said spout being adjustable to selectively vary the cross-sectional size of the lower end thereof whereby the position of the spout and the amount of crops discharged from the spout upon the cup-shaped member may be selectively adjusted to thereby permit more even distribution of the material upon the screen device.

2. The apparatus as defined in claim 1 wherein said control spout is comprised of a plurality of vertically disposed similar panel elements, and means engaging the lower end portion of said spout to selectively vary the overlap between adjacent panel elements and thereby varing the cross-sectional size of the lower end of the spout.

3. The apparatus as defined in claim 1 wherein said securing means includes a mounting member formed of magnetic material positioned upon the lower of said crop receiving member, said mounting member having a cylindrical flange projecting through the opening in the lower wall of said grain receiving member, means securing the upper end of said spout to said flange, and magnetic means adjustably securing said mounting member to said crop receiving member.

4. The apparatus as defined in claim 3 wherein said mounting member includes a flat body positioned upon the lower wall of said crop receiving member and having a cross-sectional size less that the cross-sectional size of said crop receiving member.

5. The apparatus as defined in claim 3 wherein said magnetic means comprises a plurality of magnetic elements positioned between said mounting member and the lower wall of said crop receiving member.

6. The apparatus as defined in claim 1 wherein said fan assembly includes an electric motor, means mounting said electric motor interiorly of said funnel-shaped member.

7. The apparatus as defined in claim 2 wherein said means engaging the lower end portion of said spout comprises an elastic ring element.

* * * * *